Feb. 13, 1951     H. J. BUTLER     2,541,031
FLUID PRESSURE OPERATED DISK BRAKE
FOR THE LANDING WHEELS OF AIRCRAFT
Filed Sept. 14, 1946     5 Sheets-Sheet 1
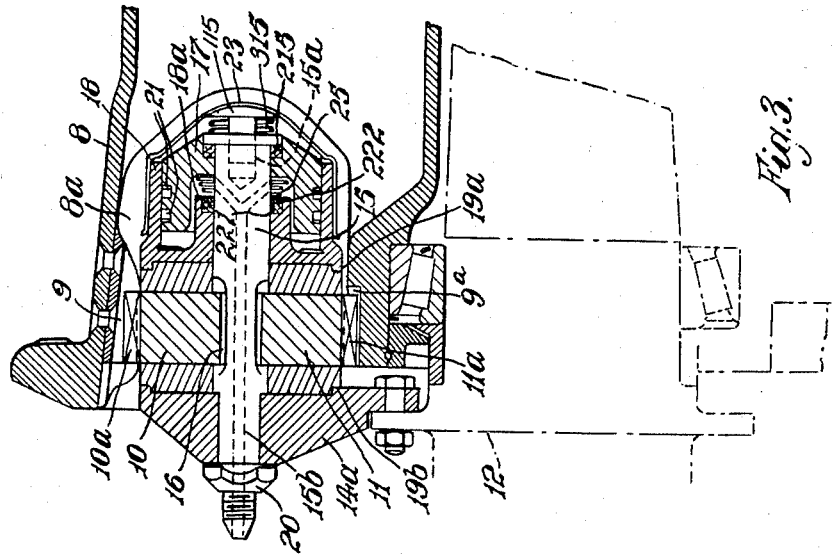
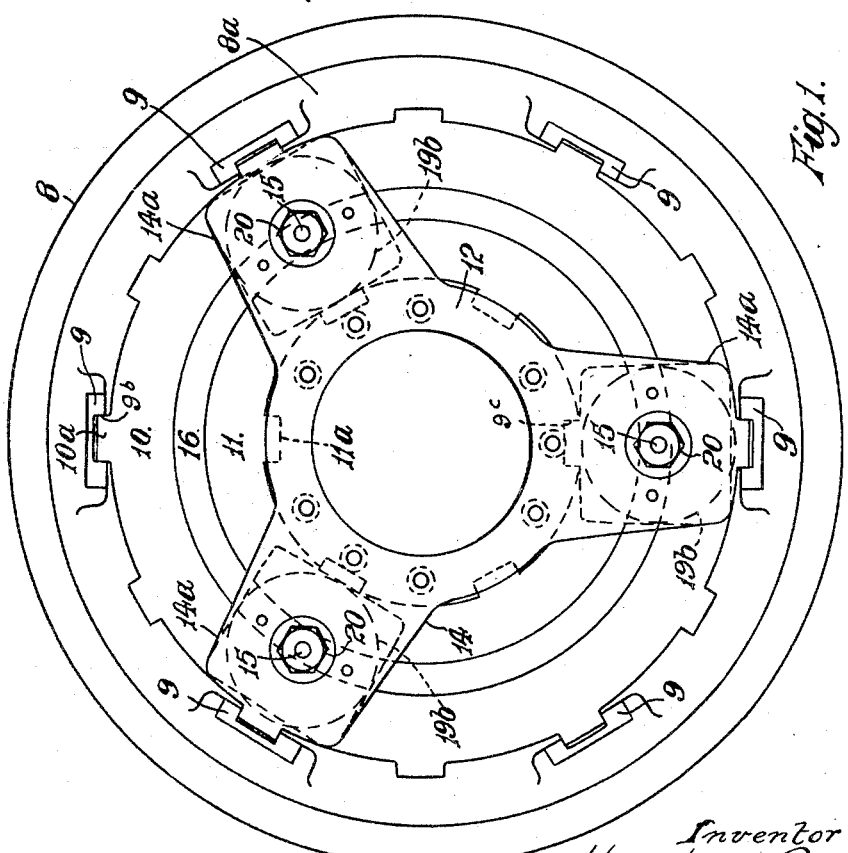
Inventor
Henry James Butler
by Benj. T. Rauber
his attorney

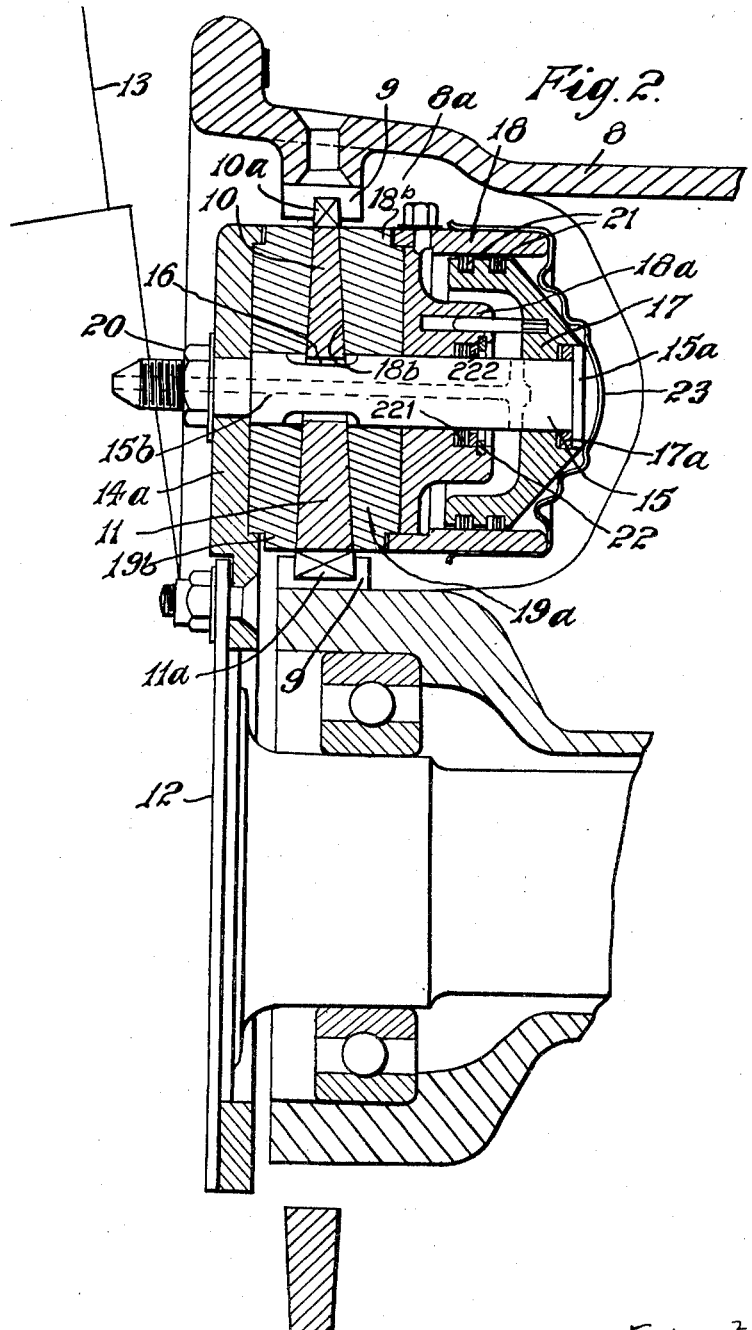

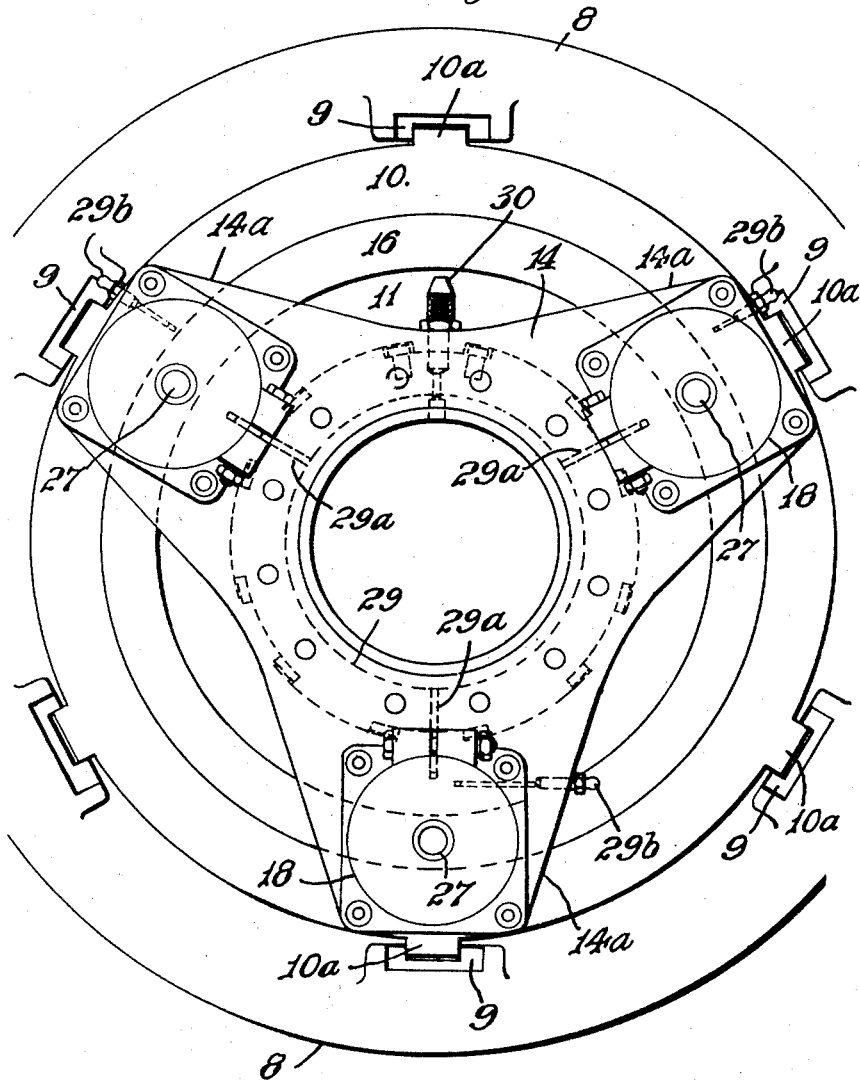

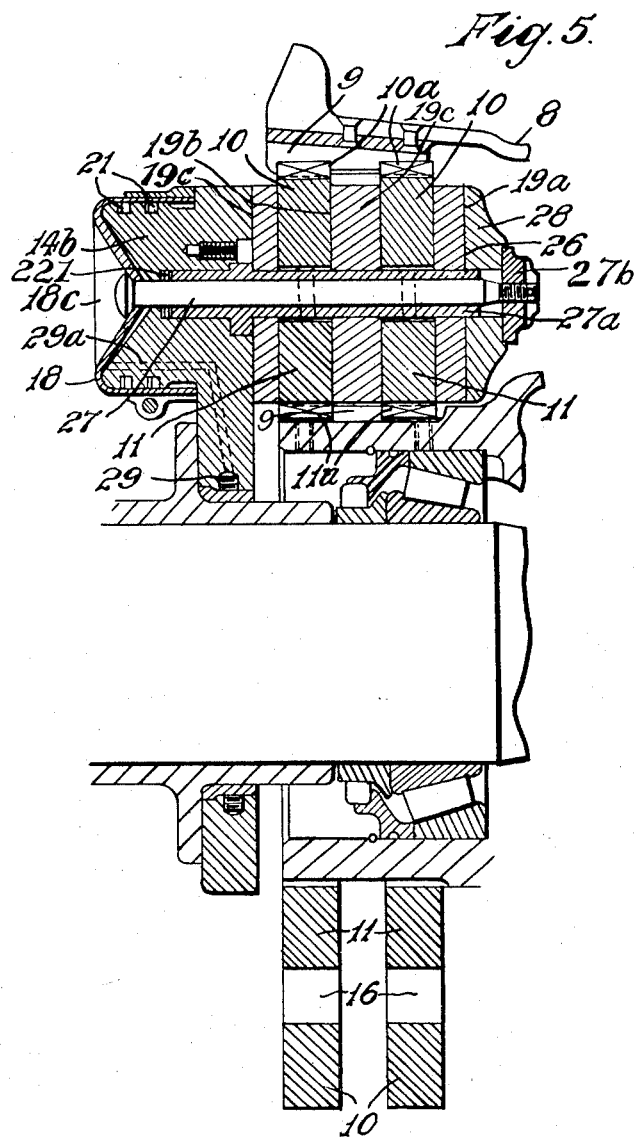

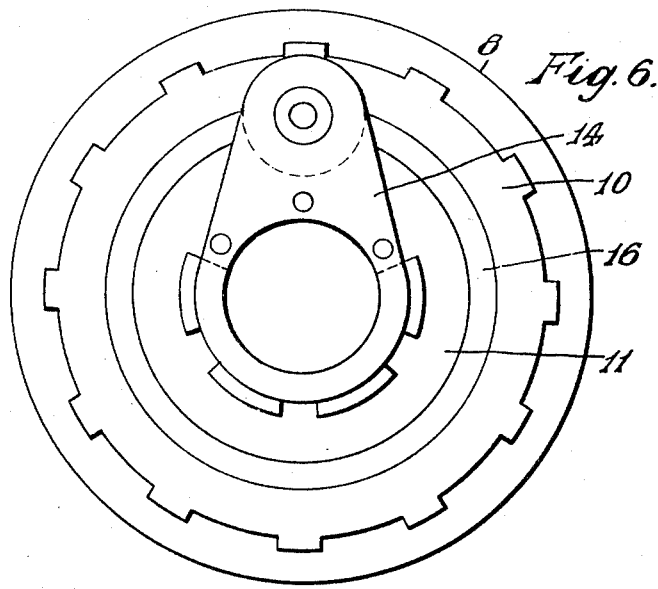
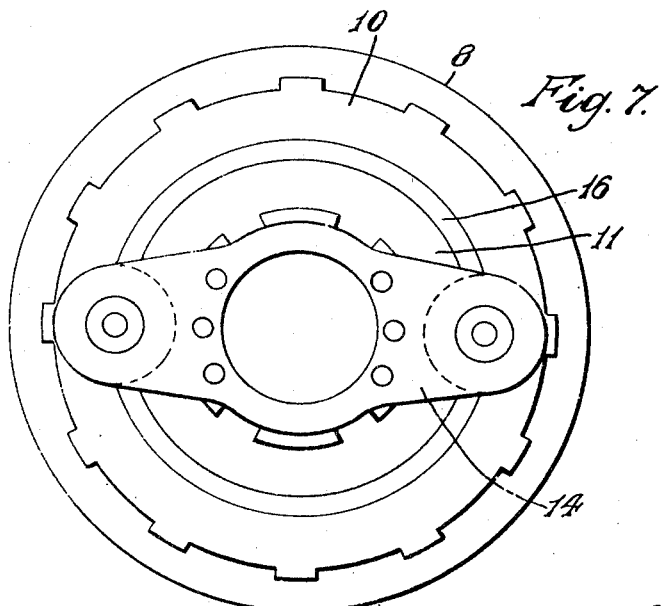

Patented Feb. 13, 1951

2,541,031

UNITED STATES PATENT OFFICE 2,541,031

FLUID PRESSURE OPERATED DISK BRAKE FOR THE LANDING WHEELS OF AIRCRAFT

Henry James Butler, Sutton Coldfield, England, assignor to Dunlop Rubber Company Limited, county of London, England, a British company Application September 14, 1946, Serial No. 697,014
In Great Britain December 3, 1945

8 Claims. (Cl. 188—152)

My invention has reference to improvements in brakes and is concerned more particularly though not exclusively with brakes for the landing wheels of aircraft and has for its object to provide a brake which is light in weight and which has a relatively large area of braking surface and in which provision is made for facilitating the dissipation of the heat which is generated during a braking operation so as to provide for a cool running brake.

The wheel and brake mechanism of my invention comprises a wheel, radially spaced coaxial inner and outer annular brake discs engaging with said wheel to be rotated thereby, said discs being capable of limited axial displacement relative to said wheel, non-rotatable friction members disposed adjacent opposite surfaces of the discs and adapted to contact at any moment only a portion of the braking area of said discs, and operating means co-acting with said non-rotatable members for effecting frictional engagement between said discs and said friction members.

The invention will now be described with particular reference to the accompanying drawings which illustrate the invention in its application to brakes for use with an aircraft landing wheel of generally known construction, and which brakes are adapted for hydraulic actuation.

In the drawings:

Figure 1 is a side elevation of an aircraft landing wheel incorporating a construction of brake in accordance with the invention.

Figure 2 is a transverse sectional view on an enlarged scale of part of the wheel and part of the brake as illustrated in Figure 1.

Figure 3 is a view generally similar to Figure 2 but illustrating another construction of brake in accordance with the invention.

Figure 4 is a side elevation of an aircraft landing wheel incorporating a further construction of brake in accordance with the invention.

Figure 5 is a fragmentary view in transverse section on an enlarged scale of part of the wheel and the brake illustrated in Figure 4.

Figure 6 is a side elevation illustrating somewhat diagrammatically yet another construction of brake in accordance with the invention and Figure 7 is a side elevation also illustrating somewhat diagrammatically still another construction of brake in accordance with the invention.

In the drawings like numerals of reference indicate similar or analogous parts in the several views.

Referring first to the embodiment of the invention as illustrated in Figures 1 and 2.

The body of the aircraft wheel 8 is formed with a recessed peripheral portion 8a the inner and outer walls of which have secured thereto adjacent to the open end of the said recessed portion a plurality of oppositely disposed equidistantly spaced slotted brackets 9 and 9a of a channel shape in cross section. The open ends of the slots 9b and 9c in the brackets 9 and 9a are presented towards each other and the axes of the slots are arranged parallel to the axis of rotation of the wheel 8.

The outer series of slotted brackets 9 accommodate complementary projections 10a associated with the outer periphery of an annular brake disc 10 of a truncated triangular shape in cross section the said projections 10a being capable of axial movement within the slots in their respective brackets 9.

The inner series of slotted brackets 9a accommodate in a like manner projections 11a associated with the inner periphery of an inner annular brake disc 11 which also is of a truncated triangular shape in cross section the sides of the inner annulus 11 conforming to the sides of the outer annulus 10 with the inner annulus 11 constituting the base end of the truncated triangle.

The inner periphery of the outer annulus 10 is spaced radially from the outer periphery of the inner annulus 11.

Bolted to the back plate 12 carried by a wheel leg 13 of an aircraft is a spider or support 14 having three equidistantly spaced arms 14a. Adjacent to the end each arm 14a of the spider 14 is provided with a hole through each of which is passed the outwardly directed portion of a pin 15 having a head 15a on the inwardly directed end thereof. The shanks of these pins 15 pass through the space 16 between the inner and outer annular brake discs 10 and 11 respectively. The heads 15a of the pins 15 are seated in recesses 17a, Fig. 2, in cup shaped members 17 which are filled with hydraulic fluid. These cup shaped members 17 are enveloped by cup shaped sleeves 18 having inwardly directed projecting portions 18a adapted to work within the cup shaped members 17. The acting faces of the sleeves 18 are in contact with the adjacent faces of brake pads 19a presented to the annular brake discs 10 and 11. Similar brake pads 19b are interposed between the outwardly directed faces of the annular brake discs 10 and 11 respectively and the adjacent faces of the arms 14a of the spider 14.

Each of the brake pads 19a and 19b is made in two parts so as to facilitate initial assembly and replacement and each hydraulic assembly is held together by its pin 15 and a nut 20 which engages the threaded and projecting outer end of the pin 15.

Sealing rings 21 are interposed between the cup shaped members 17 and the walls of the sleeves 18 and sealing rings 221 and cover plates 222 held in position by split rings 22 are associated with the projecting portions 18a of the said sleeves 18. The spaces between the respective sleeves 18 and the cup shaped members 17 are filled with liquid and are in communication with the pressure lines by way of axial bores 15b in the pins 15.

The open ends of the sleeves 18 are enclosed and gripped frictionally by envelopes 23 having corrugated bottoms. The corrugation of the bottoms of the envelopes 23 permits of a slight flexing of the said envelopes when relative displacement takes place between the sleeves 18 and cup shaped members 17 on the introduction of fluid pressure into the space between these members. Thus when the pressure is relieved the envelopes 23 return to their initial position and draw the sleeves 18 with them so that the said envelopes act as return springs.

The frictional grip between the envelopes and the sleeves 18 also permits of automatic adjustment of the positions of the friction pads 19a to compensate for wear of the friction surfaces. This takes place in the following manner: As wear of the pads 19a, 19b takes place the amount of travel of the pads 19a when the brakes are applied increases and consequently the degree of flexing of the envelopes 23 also increases. When this exceeds a certain value the force required to produce further flexing will be greater than that required to cause the sleeves 18 to slip in the envelopes 23 and the sleeves will, therefore, slip until the pads and annular braking surfaces are in frictional contact. When the braking pressure is relieved the pads will be withdrawn only by an amount corresponding with the movement of the envelopes on their return to their unstressed state, and the distance between the friction surfaces of the pads will thus remain constant.

It will be appreciated that during a braking operation braking pressure is not exerted continuously on the whole of the annular braking surfaces 10 and 11 but only at the three equidistantly spaced positions so that a part which has been heated by the application of braking pressure can be subjected to cooling before the said part is again called upon to be subjected to heating by other of the pressure exerting means.

Further it will be appreciated that the annular space 16 between the annular braking surfaces 10 and 11 admits of the circulation of cooling air which ensures the rapid dissipation of heat.

Moreover it will be appreciated that the brake is light in weight and that by arranging for the annular braking surfaces 10 and 11 to be axially displaceable the brake pads 19a, 19b are able to exert pressure on both sides of the annular braking surfaces 10 and 11.

The arrangement of the pressure exerting sleeves 18 is such that if relieved of all pressure the brake pads 19a, 19b can be readily removed for replacement purposes, said operation being facilitated by reason of the said brake pads being formed in two parts.

In the construction illustrated in Figure 3 the annuli 10 and 11 are of a rectangular shape in cross section instead of the truncated triangular shape of these parts as shown in Figure 2 and with the braking surfaces of the annulus 11 constituting a continuation of the braking surfaces of the annulus 10. Further instead of employing envelopes 23 with corrugated bottoms the sleeves 18 are enclosed by and gripped frictionally by envelopes 23 which are nonyielding in character but which also permit relative displacement between the sleeves 18 and members 17 to provide automatic adjustment to compensate for wear of the friction surfaces. A return spring 315 is located between the head of a pin 115 and the head of pin 15. A sealing ring 215 is provided between the head of the pin 15 and the member 17. Between the member 18a and the pin 15 is provided a seal 221 and cover plate 222 held in place by a light spring 25.

Otherwise the construction, arrangement and operation of the form of brake illustrated in Figure 3 is substantially the same as that illustrated in Figures 1 and 2.

In the construction illustrated in Figures 4 and 5 a three armed spider 14 having three equidistantly spaced arms 14a again is employed and the inner periphery of the wheel 8 is provided with slotted brackets 9 which accommodate projections 10a on two sets of outer annuli 10 and two sets of inner annuli 11 which are spaced apart axially. The outer and inner annuli of each set are spaced apart radially and adapted to pass through the space between the annuli are sleeves 27a within which are disposed pins 26. The two sets of annuli 10 and 11 are spaced apart axially by brake pads 19a, 19b, 19c. The innermost brake pads 19a abut end blocks 28 whilst the outer brake pads 19b abut the presented faces of the respective arms 14a. Each pin 27 is axially arranged and the headed outer end thereof is located within an inwardly directed truncated recess 18c in the centre of the head of a sleeve 18. The sleeves 18 each enclose a complementarily shaped block 14b associated with the arms 14a of the spider 14 and a liquid proof seal between the blocks 14b and the sleeve 18 is obtained by means of sealing rings 21. The spaces between the inner surfaces of the sleeves 18 and the blocks 14b are in communication by way of passages 29a with an annular passage 29 having a sealing ring 291 and connected to the fluid pipe lines by way of a nipple 30. Seals 221 are provided between the pins 27, sleeves 26 and blocks 14b'.

The assembly of annuli 10 and 11 brake pads 19a, 19b, 19c and the sleeves 18 are held together by nuts 27b which are screwed on to the threaded inner ends of the pins 27 which extend through sleeves 27a. The nuts 27b are locked so that there is freedom between the brake pads 19a, 19b, 19c and the annuli 10, 11 when the hydraulic liquid is not under pressure.

Each hydraulic pressure applying means is provided with a passage 29b for "bleeding" purposes in known manner.

In this arrangement on application of braking pressure the fluid pressure is transmitted through the pipelines by way of the nipple 30 into the annular passage 29 whence it is transmitted to the space between the sleeves 18 and the blocks 14b by way of the respective passages 29a. The braking pressure is then transmitted through the sleeves 18, pins 27, nuts 27b and end blocks 28 to cause the brake pads 19a, 19b, 19c to apply braking pressure to the annuli 10 and 11.

Although in all of the constructions hereinbefore described the braking pressure has been applied at three equidistantly spaced positions it can be applied at one position only as is indicated in Figure 6 or at two diametrically opposite positions as is illustrated in Figure 7 or at isolated positions at angles other than 180°.

In the case of the single application shown in Figure 6 the hydraulic pressure applying system is carried by a single plate 14 which is bolted to the undercarriage leg 13 whilst in the construction illustrated in Figure 7 the two pressure applying systems are carried at the ends of a diametrically arranged plate 14 which again is bolted to the undercarriage leg 13 of the aircraft.

It will be understood that if preferred the braking pressure may be applied otherwise than hydraulically for example, pneumatically.

Although the invention has been described as applied to brakes for the landing wheels of aircraft it will be appreciated that the invention is also applicable to brakes for the wheels of other vehicles.

Having described my invention, what I claim is:

1. Brake apparatus which comprises an inner and an outer wheel bracket member, an inner and an outer brake disc secured to said inner and outer brackets respectively to permit a limited relative movement in an axial direction and having a circumferential space between the opposed edges of said discs, a stationary support having a pair of friction pads, said pads being on opposite sides of said brake discs, a guide stem secured to said support and extending through said circumferential space, a piston secured to the free end of said stem and a cylinder slidable thereon and acting against the face of one of the pads of said pair, and means to admit pressure fluid between said piston and cylinder.

2. The brake apparatus of claim 1 in which said support comprises a spider on which a plurality of pairs of said pads are mounted on said spider in symmetrical relation.

3. The brake apparatus of claim 1 which comprises a spring adapted to press said piston and cylinder apart.

4. Brake apparatus which comprises a wheel, inner and outer axially displaceable annular brake discs spaced radially apart and rotatable by said wheel, a pair of non-rotatable friction pads disposed on opposite sides of said discs, supporting means for said pads on opposite sides of said disc, said pads and supporting means extending circumferentially over a minor proportion only of the discs, said pads being relatively displaceable in an axial direction, and fluid pressure operated mechanism to effect said displacement and bring about frictional contact between the pads and the discs, said mechanism comprising a guide stem extending through the space between said discs and operatively connected to one of the pads of said pair, and fluid actuated elements, comprising a cylinder and a piston, relatively displaceable in an axial direction, one of said elements being connected to said guide stem and the other reacting against the other pad of said pair to press said pads against said discs.

5. Brake apparatus which comprises a wheel, inner and outer axially displaceable annular brake discs spaced radially apart and rotatable by said wheel, a pair of non-rotatable friction pads disposed on opposite sides of said discs and extending circumferentially over a minor proportion of the discs, said pads being relatively displaceable in an axial direction, and fluid pressure operated mechanism to effect said displacement and bring about frictional contact between the pads and the discs, said mechanism comprising a stationary support secured at one side of the discs and associated with one of said pads, a piston and cylinder device whereof the cylinder comprises a skirt portion and a base having an acting face operatively associated with the other of said pads, means to admit pressure fluid between said piston and cylinder and a guide stem passing through the space between the discs having one end secured to said piston and the other end secured to said stationary support.

6. Brake apparatus which comprises a wheel, inner and outer axially displaceable annular brake discs spaced radially apart and rotatable by said wheel, a pair of non-rotatable friction pads disposed on opposite sides of said discs and extending circumferentially over a minor proportion of the discs, said pads being relatively displaceable in an axial direction, and fluid pressure operated mechanism to effect said displacement and bring about frictional contact between the pads and the discs, said mechanism comprising a stationary support secured at one side of the discs and associated with one of said pads, a guide sleeve secured to said stationary support and passing through the space between the discs, a piston and cylinder device wherein the piston is secured to the stationary support and the cylinder comprises a base portion and a sleeve portion surrounding the piston, means to admit pressure fluid between the cylinder base and the piston, a pressure plate on the side of the discs remote from the piston and cylinder and a guide stem extending through the guide sleeve and associated with the cylinder and pressure plate, whereby on the admission of pressure fluid to the cylinder axial displacement of the guide stem and pressure plate takes place thereby effecting frictional engagement between the pads and the discs.

7. Brake apparatus according to claim 4 which comprises a plurality of circumferentially spaced pairs of friction pads and fluid pressure operated mechanisms.

8. Brake apparatus according to claim 5 which comprises a plurality of circumferentially spaced pairs of friction pads and fluid pressure operated mechanisms.

HENRY JAMES BUTLER.

REFERENCES CITED

The following references are of record in the file of this patent:

UNITED STATES PATENTS

| Number | Name | Date |
|---|---|---|
| 2,108,059 | Glasner | Feb. 15, 1938 |
| 2,274,885 | Brown | Mar. 3, 1942 |
| 2,319,231 | Hawley | May 18, 1943 |
| 2,351,041 | Hawley | June 13, 1944 |
| 2,366,093 | Forbes | Dec. 26, 1944 |
| 2,419,113 | Bricker | Apr. 15, 1947 |